United States Patent [19]

Starcevic

[11] 4,293,786
[45] Oct. 6, 1981

[54] CARRYING AND GUIDING SPIDER FOR THE SUPPORT OF A ROTOR OF A VERTICAL ELECTRICAL MACHINE

[75] Inventor: Mihailo Starcevic, Mellingen, Switzerland

[73] Assignee: BBC Brown, Boveri & Company, Limited, Baden, Switzerland

[21] Appl. No.: 93,973

[22] Filed: Nov. 14, 1979

[30] Foreign Application Priority Data

Nov. 15, 1978 [CH] Switzerland .................. 11728/78

[51] Int. Cl.³ ............................................. H02K 5/00
[52] U.S. Cl. ..................................... 310/157; 310/91
[58] Field of Search .................... 310/157, 91, 90, 89, 310/258, 261

[56] References Cited

U.S. PATENT DOCUMENTS

| 3,293,464 | 12/1966 | Spirk | 310/157 |
|---|---|---|---|
| 3,387,152 | 6/1968 | Muke | 310/157 |
| 3,803,434 | 4/1974 | Tamatsukuri | 310/157 |
| 3,935,490 | 1/1976 | Spirk | 310/157 |
| 4,060,744 | 11/1977 | Starcevic | 310/157 |

FOREIGN PATENT DOCUMENTS

| 658858 | 1/1965 | Belgium | 310/157 |
|---|---|---|---|
| 2249978 | 5/1973 | Fed. Rep. of Germany | 310/157 |
| 2459236 | 5/1976 | Fed. Rep. of Germany | 310/157 |
| 1401877 | 4/1965 | France | 310/157 |
| 1092817 | 11/1967 | United Kingdom | 310/157 |

*Primary Examiner*—R. Skudy
*Attorney, Agent, or Firm*—Oblon, Fisher, Spivak, McClelland & Maier

[57] ABSTRACT

A carrying and guiding spider for the support of a rotor of a vertical electrical machine contains two different kinds of arms (6, 16) whereby the one kind of the arm (6) is supported on the foundation (12) in a sliding manner and forms acute angles (+A) in a circumferential direction with a radial line (17) of the clamping point (6') and the other kind of the arm (16) is rigidly connected with the foundation (12) and forms the acute angles (−A) in the opposite circumferential direction with the radial line (17) of the clamping points (16'). The advantage of this solution lies in that the carrying and guiding spider is symmetrically subjected to the load in the axial direction so that there is no torsional moment. At the same time, this construction permits the centering and the free expansion of the central body.

7 Claims, 3 Drawing Figures

CARRYING AND GUIDING SPIDER FOR THE SUPPORT OF A ROTOR OF A VERTICAL ELECTRICAL MACHINE

BACKGROUND OF THE INVENTION

1. Field of the Invention

The present invention concerns a carrying and guiding spider for the support of a rotor of a vertical electrical machine, with arms which comprise acute angles with the radial directions at the clamping points on the central body of the carrying and guiding spider whereby the arms are extended between the central body, and a foundation of annular shape.

2. Description of the Prior Art

A carrying arrangement for the shaft support of a vertical, electrical machine is described and shown in the German Pat. No. 2,459,236, whose connecting elements are disposed at acute angles with the radial directions at their clamping points and whose ends are rigidly connected with an annular-shaped foundation. These connecting elements are inelastic in the longitudinal direction. The central ring rotates during the axial load owing to the deformation of the connecting elements. The solution of the aforementioned German Patent secures the central position of the inner ring. However, a rather large deformation occurs with this solution owing to the axial forces.

SUMMARY OF THE INVENTION

An object of the invention is to create a carrying and guiding spider for the support of a rotor of a vertical electrical machine which does not have the disadvantages of the known one and maintains its advantages and, additionally, also substantially prevents the deformation of the connecting elements.

The above mentioned task is accomplished with a carrying and guiding spider in which the arms are designed in two different ways whereby one kind of arm rests in a horizontally sliding manner on the foundation and forms the acute angles with the radial directions in a circumferential direction and the other kind of arm is rigidly connected with the foundation and forms the acute angles with the radial directions in the reverse circumferential direction.

An advantage of the invention is that, with reference to the axial load, the carrying and guiding spider is symmetrically loaded so that there is no torsional moment. The connected arms are practically identical to the above described state of the art. The slidingly supported arms effect an opposite torsional moment. Thus, the torsional moments originated by the two kinds of arms compensate for each other.

It is expedient that the acute angles which the arms form with the radial directions are equal in their absolute value and amount to a value of 10° to 40°. With the absolutely equal angles, the torsional moments created by the axial load and having an effect on the central body are entirely eliminated by one another. The advantage of a larger angle lies in the fact that the bending stresses created by the rotation are lower. The size of the acute angles is, however, limited for constructional reasons.

It is advantageous that the arms be designed as plates arranged in vertical planes. In such a case, the arms resist bending in the vertical direction.

According to an advantageous embodiment, the central body contains supports for supporting bearing segments whereby these supports are fastened, between an upper ring and a lower ring, on ribs which run underneath them and connect the rings through their upper portions. The advantage of this design is that the supports are near the ribs so that the strength of the central body is further increased. The upper ring is substantially subject only to pressure in the horizontal plane and the lower ring only to tensile stress.

Expediently, the ribs are designed as straight-line extensions of the arms. Thus they each form a tension and pressure-resistant unit. In accordance with one design, the upper ring is provided with a guide bearing for the radial support of the carrying ring of the rotor. The radial support of the rotor is economically implemented in this manner.

It is particularly advantageous that the foundation have at least one cylindrical inner surface whereby the arms supported in a sliding manner have a radial clearance vis-a-vis the foundation.

The advantage of this embodiment lies in the fact that, by using proper dimensions for the slidingly supported arms, these arms are extended by thermal expansion under hot running conditions of the electrical machine in such a way that they contact the foundation in the radial direction and thus become equal to the rigid arms.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
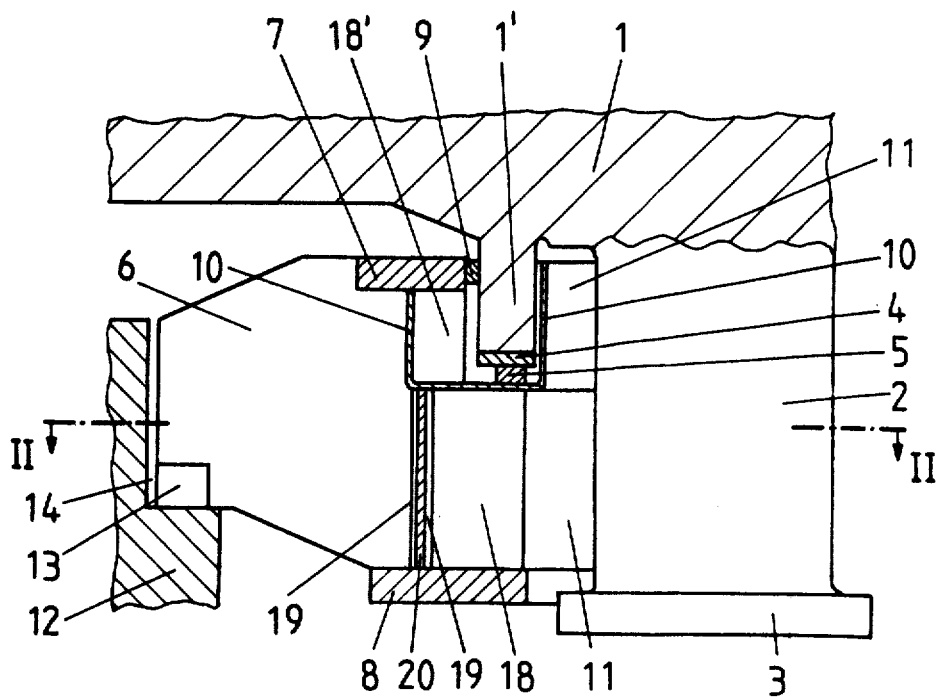
FIG. 1 shows a partial vertical section through an embodiment of the carrying and guiding spider according to the invention.

According to FIG. 1, a rotor 1 is provided with a carrying ring 1' and a shaft 2 with a flange 3. Several supporting bearing segments 4 rest on supports 5. Only one arm 6 is visible in FIG. 1 which is arranged between an upper ring 7 and a lower ring 8 which form a central body, together with the elements between the rings. The upper ring 7 is provided with a guide bearing 9 for the radial support of the carrying ring 1' of the rotor 1. The supporting bearing segments 4 and the supports 5 rest in an oil container 10. There is a space 11 between the shaft 2, on the one hand, and the lower ring 8 and the oil container 10, on the other hand. The outer portion of the arm 6 is slidingly supported on the foundation 12. This portion of the arm 6 is provided with base plates 13 which distribute the pressure on the foundation 12 to a larger surface. A clearance 14 is shown in FIG. 1, which represents the carrying and guiding spider in cold condition, between this end of the slidingly arranged arm 6 and the cylindrical wall of the foundation 12. A rib 18 is arranged between the upper ring 7 and the lower ring 8 as an extension of the arm 6 which forms a direct support of the upper ring 7 with its upper portion 18'. The rib 18 is connected with the arm 6 through flanges 19 between which a connecting rib 20 is fastened.

Figure 2:
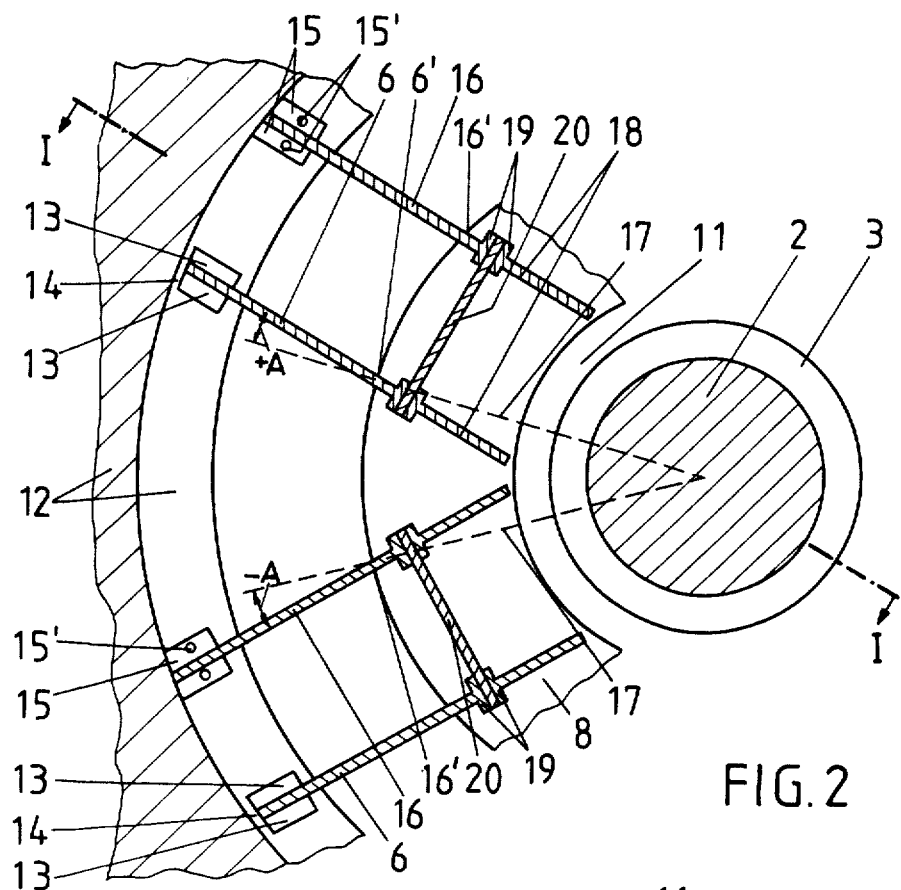
FIG. 2 shows the cross-section II—II from FIG. 1.

The partial section II—II of FIG. 1 is shown in FIG. 2. In FIG. 2, there are also arms 16 visible which are rigidly connected with the foundation 12 by means of fastening plates 15 and fastening pins 15'. Radial directions 17 are plotted as dotted lines which pass through clamping points 6' and 16' of the arms 6 and 16. The arms 16 comprise acute angles +A with the radial directions 17 in the clamping points 6' and the arms 16 acute angles −A in the clamping points 16' whereby the angle A amounts to approximately 15° in this embodiment. Also the connecting ribs 20 which are fastened between the flanges 19 of the arms 6 and 16 and of the ribs 18 are visible in FIG. 2.

Figure 3:
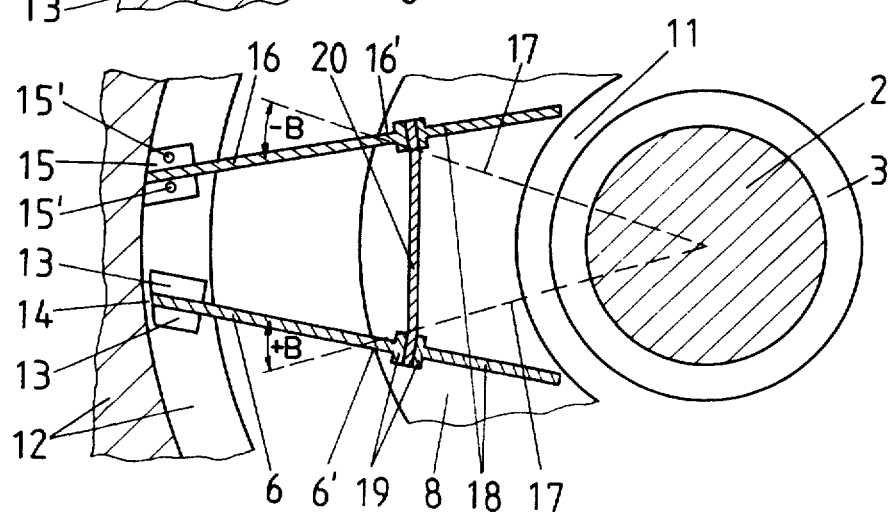
FIG. 3 shows a horizontal partial section through another embodiment where the arms comprise larger angles with the radial direction.

Another embodiment is shown in FIG. 3 in a partial horizontal cross-section. This solution essentially corresponds with that according to FIGS. 1 and 2 but the arms 6 and 16 comprise in their clamping points 6' and 16' acute angles +B and −B with the radial directions 17 which are larger than the acute angles +A and −A according to FIG. 2. The angle B according to FIG. 3 amounts to approximately 27°.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A carrying and guiding spider for supporting a rotor of a vertical electrical machine, said machine including an annular foundation surrounding a central body supporting said rotor, said spider comprising:

- at least one first arm having one end clamped to said central body at a first clamping point and having another end extending to said foundation and horizontally slidingly resting on said foundation;
- at least one second arm having one arm clamped to said central body at a second clamping point and having another end extending to said foundation and fixed to said foundation;
- wherein said at least one first arm forms a first acute circumferential angle with a radial line passing through said first clamping point and wherein said at least one second arm forms a second circumferential angle with a radial line passing through said second clamping point, said first and second angles being of equal magnitude but of opposite sense.

2. The carrying and guiding spider of claim 1, wherein the magnitude of said first and second angles is from 10° to 40°.

3. The carrying and guiding plates of claim 1, wherein said at least one first and second arms comprise vertical plates.

4. The carrying and guiding spider of claim 1 including an upper and a lower ring connected by a plurality of ribs said rings and ribs forming a portion of said central body, said ribs having a support element which supports a bearing member of said central body.

5. The carrying and guiding spider of claim 4, wherein said ribs are extensions of said at least one first and second arms.

6. The carrying and guiding spider of claim 4 wherein said upper ring includes a guide bearing for the radial support of said ring.

7. The carrying and guiding spider of claim 1, wherein said annular foundation includes at least one radial surface and wherein a radial clearance exists between said first arm and said at least one radial surface.

* * * * *